(No Model.)　　　　　　　　　　　　　　　　2 Sheets—Sheet 1.
C. H. CAMPBELL.
CAMERA STAND FOR BICYCLES.

No. 511,043.　　　　　　　　　　Patented Dec. 19, 1893.

Witnesses　　　　　　　　　　　　　Inventor
　　　　　　　　　　　　　　　　　Charlie H. Campbell
　　　　　　　　　By his Attorneys,

THE NATIONAL LITHOGRAPHING COMPANY,
WASHINGTON, D. C.

(No Model.) 2 Sheets—Sheet 2.

C. H. CAMPBELL.
CAMERA STAND FOR BICYCLES.

No. 511,043. Patented Dec. 19, 1893.

Witnesses
F. M. Johnson

Inventor
Charlie H. Campbell
By his Attorneys,
C. A. Snow & Co.

UNITED STATES PATENT OFFICE.

CHARLIE H. CAMPBELL, OF OCALA, FLORIDA.

CAMERA-STAND FOR BICYCLES.

SPECIFICATION forming part of Letters Patent No. 511,043, dated December 19, 1893.

Application filed July 24, 1893. Serial No. 481,294. (No model.)

*To all whom it may concern:*

Be it known that I, CHARLIE H. CAMPBELL, a citizen of the United States, residing at Ocala, in the county of Marion and State of Florida, have invented a new and useful Camera-Stand for Bicycles, of which the following is a specification.

My invention relates to a camera stand adapted for attachment to, and transportation by, a bicycle, and designed especially for use in connection with safety bicycles.

The object of the invention is to provide a foldable stand and support adapted to maintain the bicycle in an upright position and provided with means whereby the camera, or similar instrument, may be leveled and otherwise adjusted independently of the position of the bicycle, such stand or support and connections being capable of folding into a compact form upon the bicycle frame in such a position as not to impede the rider when the machine is in motion.

Further objects and advantages of this invention will appear in the following description, and the novel features thereof will be particularly pointed out in the appended claims.

Figure 1:
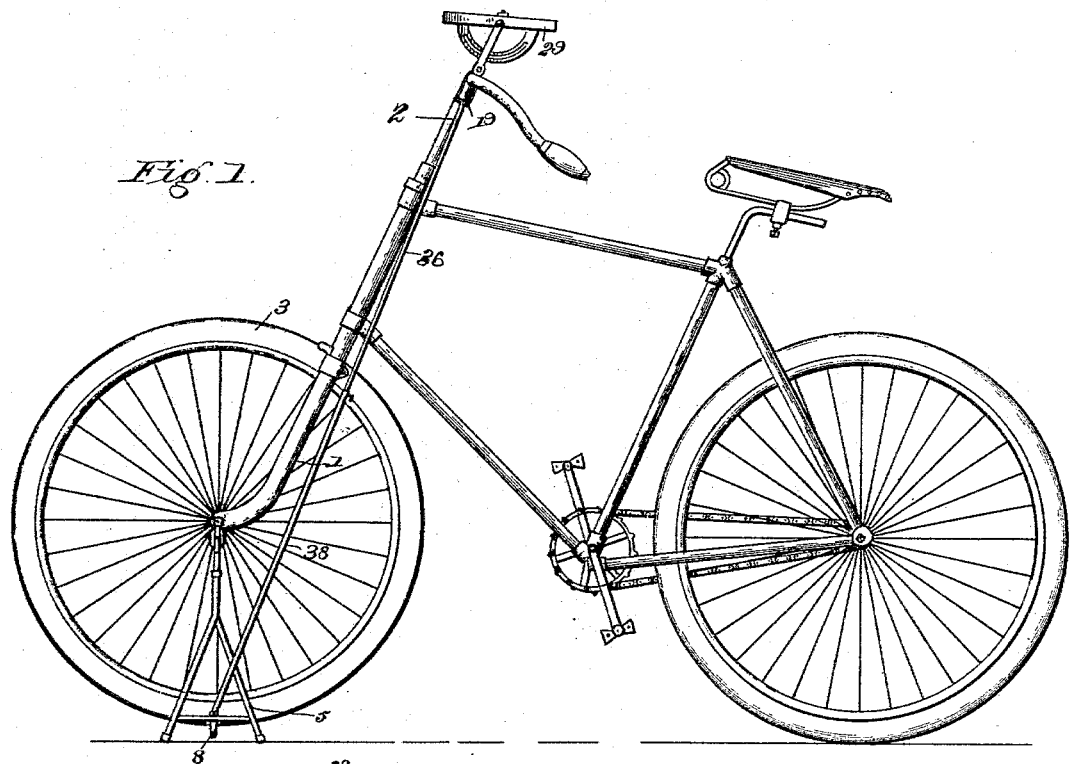
Figure 3:
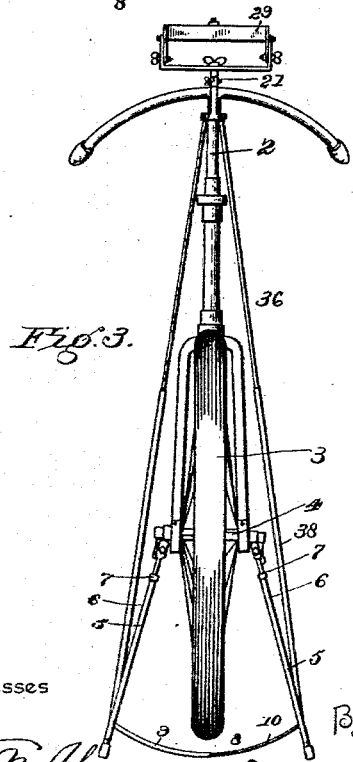
Figure 4:
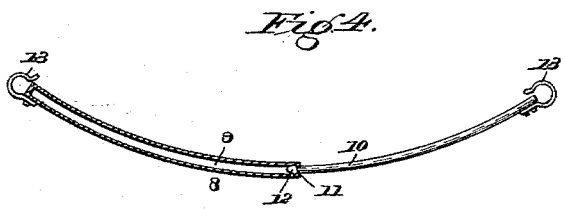
Figure 2:
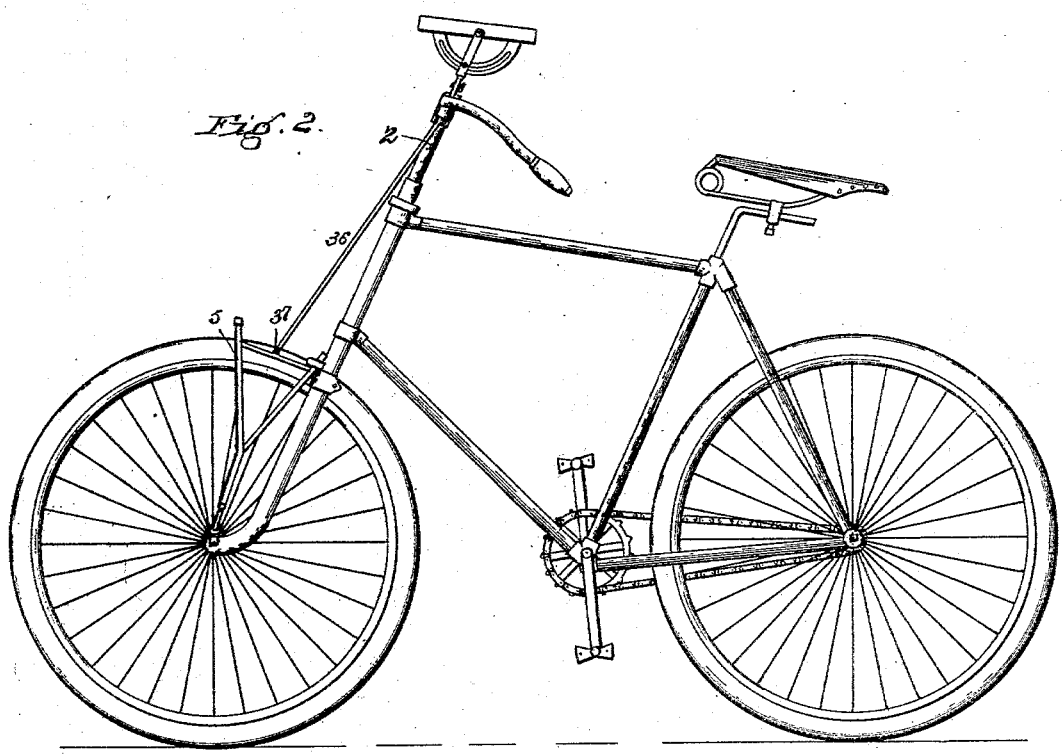
Figures 5, 6:
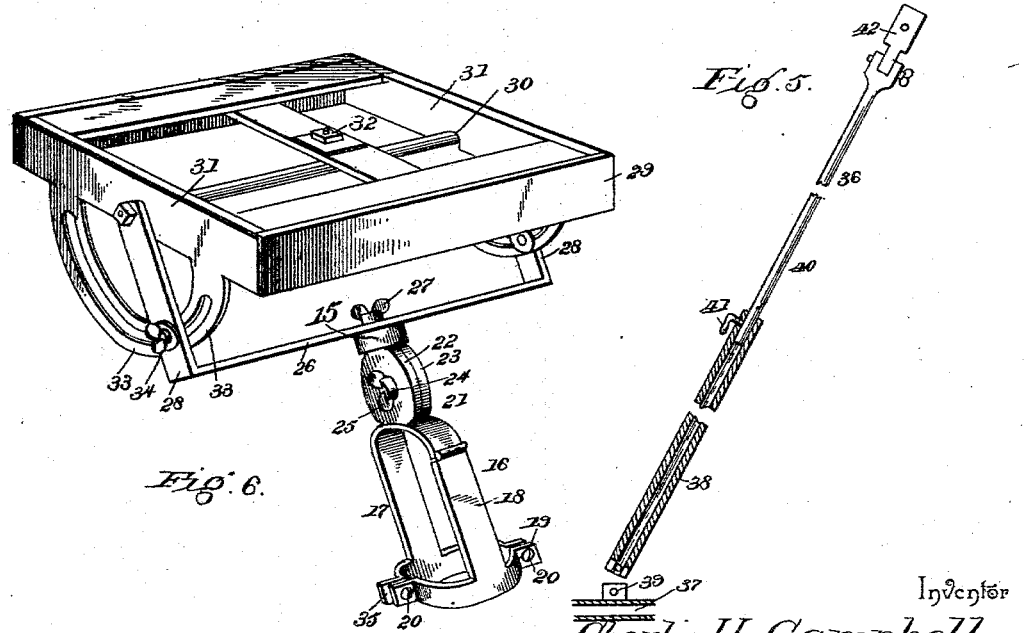

In the drawings: Figure 1 is a side view of a bicycle, showing the camera stand or support applied thereto in the operative position. Fig. 2 is a similar view, showing the parts in the folded position. Fig. 3 is a front view. Fig. 4 is a detail view of the extension brace between the lower ends of the pivotal rests. Fig. 5 is a similar view of one of the braces for connecting the lower ends of the rests to the head of the machine. Fig. 6 is a detail view, in perspective, of the tilting camera holder and the clamp for attachment to the head of the machine.

Similar numerals of reference indicate corresponding parts in all the figures of the drawings.

1 designates the front fork, 2 the head or steering bar, 3 the front or steering wheel, and 4 the axle of the latter. The axle 4 is provided with longitudinal extensions, upon which are fulcrumed the upper ends of the swinging rests 5, the stems 6 of such rests being jointed as shown at 7, to permit of lateral adjustment of the lower ends of the rests.

8 represents an extension brace connecting the lower free ends of the rests and comprising the curved telescoping sections 9 and 10, the former of which is hollow to receive the latter. A shoulder 12 upon the section 10, is adapted to engage a stop 11, at the inner end of the section 9 to limit the extension of the brace, and the outer terminals of the sections are provided with clips 13 to engage the cross-bars 14 at the lower ends of the rests.

15 represents a hub provided with a depending clamp 16, which comprises a fixed jaw 17 and a hinged or pivoted jaw 18, such jaws being provided, at their lower ends, with a horizontally-disposed clip 19. One-half of this clip is carried by each jaw of the clamp, and the two parts thereof are connected, when properly adjusted upon the head or steering-bar of the machine, by means of the bolts 20. The head 15 is connected to the clamps 16 by means of an adjustable coupling 21, comprising a disk 22, carried by the head, and a corresponding disk 23, carried by the clamp and connected to the disk 22 by a transverse pivot-bolt 24, provided with a thumb-nut 25. Pivotally connected to the upper end of the head 15 is a yoke 26, adapted to be locked at the desired annular adjustment by means of a thumb-nut 27, and provided with vertical parallel terminal arms 28, between the upper ends of which is pivoted the table 29. A cross-rod 30 connects the upper ends of these parallel terminals 28 and forms the fulcrum for the platform 29, which is provided with lateral depending flanges 31, which are perforated to receive the cross-rod. This platform is provided at its center with a securing-bolt 32, adapted to engage the base of the camera or other instrument which is supported thereupon. Furthermore, the platform is provided with depending slotted segmental guides 33, which receive the adjusting-bolts 34, carried by the vertical arms of the yoke 26, whereby the platform may be adjusted at any desired inclination.

The sections of the clip 19 are provided with terminal parallel ears 35, which, as before explained, are connected by the bolts 20, and secured between these parallel ears are the upper ends of inclined telescoping braces 36, connected at their lower ends to the cross-bars of the rests. Clips 37 are rotatably mounted upon the cross-bars of the rests and the lower tubular members 38 of the braces are pivotally connected to the ears 39, with which such revoluble clips are provided. The upper members 40 of the braces fit slidably in the tubular portions or members and are adapted to be locked in place by means of a set-screw 41, or similar locking device. The upper ends of the members 40 are provided with the pivotal coupling-links 42, which are, in turn, pivoted upon the bolts 20, by which the terminals of the sections of the clip 19 are connected.

This being the construction of the improved camera stand or support, the operation thereof, briefly stated, is as follows: With the parts in the extended or operative position, which is shown in Fig. 1, the front wheel of the machine is elevated slightly above the surface of the ground, the rests are extended or spread to form a broad base, and the head of the machine which bears the camera support proper is connected to these rests to prevent vibration. To fold the parts for transportation the adjusting devices 41 are loosened, the machine is backed sufficiently to bring the front wheel to the ground, and the lower ends of the rests are elevated or swung upwardly upon opposite sides of the front wheel until engaged by the spring-clamps 43, which are secured to the fork of the bicycle. The transverse telescoping brace by which the lower ends of the rests are connected should be contracted previous to folding the rests, and in elevating the latter the brace will swing outside of the periphery of the wheel. Furthermore, the side or inclined braces will contract or telescope as the rests are elevated. Thus, when folded, the parts of the support and rests occupy positions in front of the fork of the machine, where they are out of the way of the rider and cannot impede his movements in operating the machine.

It will be understood that the parts as described are readily detachable from the bicycle and may be attached with equal facility, the general construction being such as to adapt the apparatus for application to any machine of the class mentioned.

Various changes in the form, proportion, and the minor details of construction may be resorted to without departing from the principle or sacrificing any of the advantages of this invention.

Having described the invention, what I claim as new is—

1. The combination with a bicycle, of side rests pivotally connected thereto, a support for a camera connected to the head of the machine, and side braces connecting said support and rests, substantially as specified.

2. The combination with a bicycle, of side rests pivotally connected thereto, a support for a camera secured to the head of the machine, side braces connecting said support and rests, and means for locking the rests in either their elevated or depressed positions, substantially as specified.

3. The combination with a bicycle, of side rests pivotally connected thereto, a support for a camera secured to the head of the machine, extensible side braces connecting said support and rests, and means for locking said braces at any desired extension, substantially as specified.

4. The combination with a bicycle, of side rests pivotally connected thereto, a support for a camera having a clamp comprising a fixed jaw and a pivoted jaw, a divided clip one member of which is carried by each of said jaws, and bolts for connecting the extremities of said members, and side braces secured at their upper extremities to the bolts connecting the members of the divided clip and connected at their lower ends to the said rests, substantially as specified.

5. In a camera support for bicycles, the combination with a supporting platform, and a clamp connected thereto and adapted to be secured to the head of the machine, of pivoted rests adapted to swing parallel with the plane of the front or steering wheel, telescoping side braces connected at their upper ends to the said clamp and at their lower ends to the lower ends of the rests, and clamps secured to the forks of the machine to hold the rests in their folded positions, substantially as specified.

6. In a camera support for bicycles, the combination with a supporting platform, and means for securing the same to the head of the bicycle, of rests pivotally connected to the framework of the machine and capable of swinging in the plane of the front or steering wheel and of swinging laterally at their lower or free ends, a transverse extensible brace connecting the lower ends of said rests, extensible side braces connected at their lower ends to the rests and at their upper ends to the said clamping devices, and clamps for holding the rests in their folded positions, substantially as specified.

7. The combination with a bicycle, of side rests pivotally connected thereto, a camera support comprising a clamp to be secured to the head of the bicycle, a rotatable yoke, a coupling connecting said yoke to the clamp, and a platform capable of angular adjustment upon the yoke, and side braces connecting the clamp with the said rests, substantially as specified.

In testimony that I claim the foregoing as my own I have hereto affixed my signature in the presence of two witnesses.

CHARLIE H. CAMPBELL.

Witnesses:
R. B. W. CANELL,
I. E. CONNOR.